US012519228B2

(12) United States Patent
Suzuki et al.

(10) Patent No.: US 12,519,228 B2
(45) Date of Patent: Jan. 6, 2026

(54) INTELLIGENT REFLECTING SURFACE

(71) Applicant: Japan Display Inc., Tokyo (JP)

(72) Inventors: Daiichi Suzuki, Tokyo (JP); Shinichiro Oka, Tokyo (JP); Shigesumi Araki, Tokyo (JP); Mitsutaka Okita, Tokyo (JP); Yoshiaki Amano, Fujimino (JP); Hiromi Matsuno, Fujimino (JP)

(73) Assignee: JAPAN DISPLAY INC.

( * ) Notice: Subject to any disclaimer, the term of this patent is extended or adjusted under 35 U.S.C. 154(b) by 284 days.

(21) Appl. No.: 18/477,569

(22) Filed: Sep. 29, 2023

(65) Prior Publication Data

US 2024/0039156 A1 Feb. 1, 2024

Related U.S. Application Data

(63) Continuation of application No. PCT/JP2022/016566, filed on Mar. 31, 2022.

(30) Foreign Application Priority Data

Mar. 31, 2021 (JP) ................................ 2021-060859

(51) Int. Cl.
*H01Q 3/46* (2006.01)

(52) U.S. Cl.
CPC .................................... *H01Q 3/46* (2013.01)

(58) Field of Classification Search
CPC ............................ H01Q 3/46; H01Q 15/0026
See application file for complete search history.

(56) References Cited

U.S. PATENT DOCUMENTS 6,552,696 B1 * 4/2003 Sievenpiper ............. H01Q 3/44 343/754
2018/0083364 A1 3/2018 Foo
2024/0137076 A1 * 4/2024 Yang ................. H01Q 15/0026

FOREIGN PATENT DOCUMENTS

JP H11-103201 A 4/1999
JP 2019-530387 A 10/2019

* cited by examiner

*Primary Examiner* — Cassi J Galt
(74) *Attorney, Agent, or Firm* — XSENSUS LLP

(57) ABSTRACT

According to one embodiment, an intelligent reflecting surface includes a first substrate, a second substrate, and a first dielectric layer sandwiched between the first substrate and the second substrate, the first substrate includes a first base, a plurality of first patch electrodes, a plurality of second patch electrodes, which are provided between the first base and the plurality of first patch electrodes, and a second dielectric layer provided between the plurality of first patch electrodes and the plurality of second patch electrodes, the first dielectric layer has a first dielectric constant, and the second dielectric layer has a second dielectric constant.

6 Claims, 8 Drawing Sheets

INTELLIGENT REFLECTING SURFACE

CROSS-REFERENCE TO RELATED APPLICATIONS

This application is a Continuation Application of PCT Application No. PCT/JP2022/016566, filed Mar. 31, 2022, and based upon and claiming the benefit of priority from Japanese Patent Application No. 2021-060859, filed Mar. 31, 2021, the entire contents of all of which are incorporated herein by reference.

FIELD

Embodiments described herein relate generally to an intelligent reflecting surface.

BACKGROUND

Phase shifters using liquid crystal have been developed as phase shifters for use in phased array antennas whose directivity can be electrically controlled. In a phased array antenna, a plurality of antenna elements to which high-frequency signals are transmitted from corresponding phase shifters are arranged one-dimensionally (or two-dimensionally). In the phased array antenna as described above, the dielectric constant of the liquid crystal needs to be adjusted such that the phase difference between high-frequency signals input to adjacent antenna elements becomes constant.

In addition, intelligent reflecting surfaces capable of controlling a direction of radio wave reflection using the liquid crystal have been studied, similarly to the phased array antennas. On this intelligent reflecting surface, reflection controllers including reflecting electrodes are arranged one-dimensionally (or two-dimensionally). On the intelligent reflecting surface, the dielectric constant of the liquid crystal also needs to be adjusted such that a phase difference of the reflected radio waves becomes constant between the adjacent reflection controllers.

The intelligent reflecting surface that uses the liquid crystal as a dielectric can variably control the reflection direction by the voltage applied to the liquid crystal. On the intelligent reflecting surface, however, if the phase difference amount of the reflected radio wave is insufficient, the amount of variation in the direction in which the radio wave is reflected is restricted.

DETAILED DESCRIPTION

Figure 1:
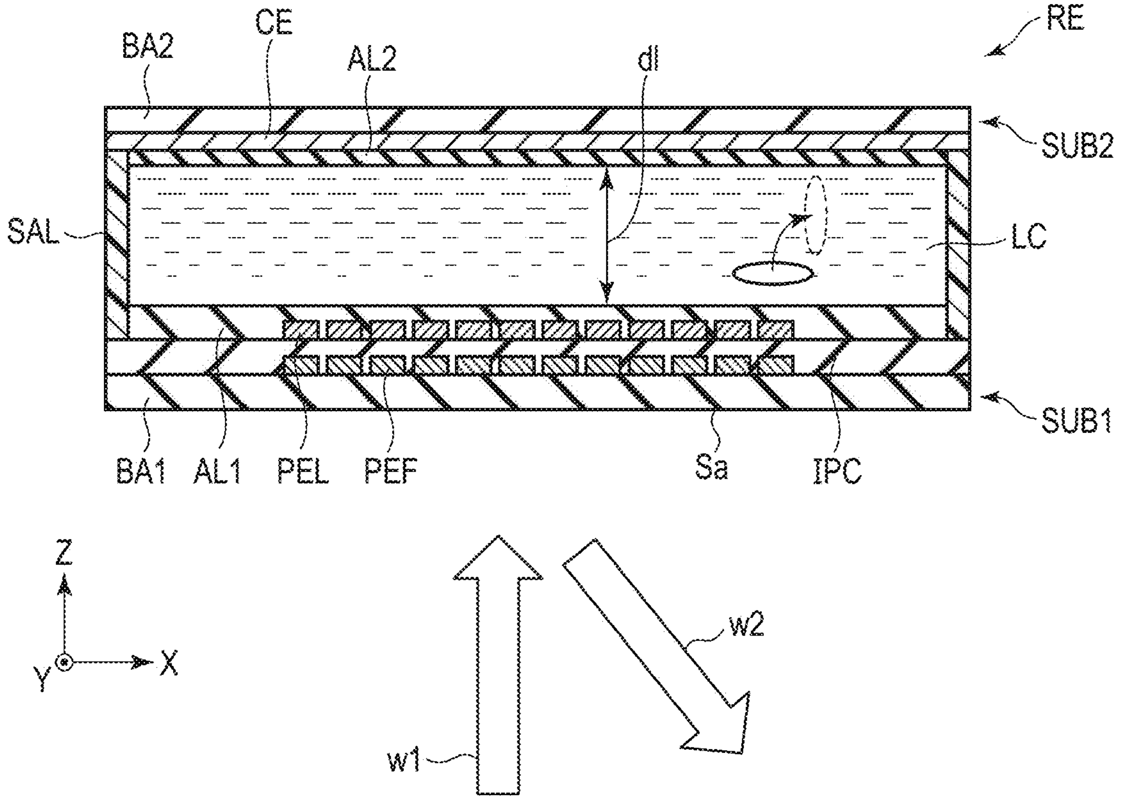
FIG. 1 is a cross-sectional view showing the intelligent reflecting surface of the embodiment.

In general, according to one embodiment, an intelligent reflecting surface comprises a first substrate;

a second substrate; and a first dielectric layer sandwiched between the first substrate and the second substrate, wherein the first substrate comprises:

a first base;

a plurality of first patch electrodes shaped in a square, which are arrayed in a matrix with regular intervals along each of a first direction and a second direction;

a plurality of second patch electrodes shaped in a square, which are provided between the first base and the plurality of first patch electrodes; and a second dielectric layer provided between the plurality of first patch electrodes and the plurality of second patch electrodes, the second substrate comprises:

a second base; and a common electrode provided to be in contact with the second base, the first dielectric layer has a first dielectric constant, and the second dielectric layer has a second dielectric constant.

Embodiments described herein aim to an intelligent reflecting surface capable of increasing an amount of phase difference of a reflected wave.

Each embodiment of the invention will be described hereinafter with reference to the accompanying drawings. The disclosure is merely an example, and proper changes within the spirit of the invention, which are easily conceivable by a person of ordinary skill in the art, are included in the scope of the invention as a matter of course. In addition, in some cases, in order to make the description clearer, the widths, thicknesses, shapes and the like, of the respective parts are schematically illustrated in the drawings, compared to the actual modes. However, the schematic illustration is merely an example, and adds no restriction to the interpretation of the invention. Besides, in the specification and drawings, the same elements as those described in connection with preceding drawings are denoted by like reference numbers, and a detailed description thereof is omitted unless necessary.

The embodiments described herein are not general embodiments, but embodiments in which the same or corresponding special technical features of the invention are described. An intelligent reflecting surface according to an embodiment will be described hereinafter with reference to the accompanying drawings.

In the embodiment, a first direction X, a second direction Y, and a third direction Z are orthogonal to each other, but may intersect at an angle other than 90°. A direction toward a tip of an arrow of the third direction Z is referred to as an upper or upward direction, and a direction opposite to the direction toward the tip of the arrow of the third direction Z is referred to as a lower or downward direction.

In addition, according to "a second member above a first member" and "a second member below a first member", the second member may be in contact with the first member or may be located separately from the first member. In the latter case, a third member may be interposed between the first member and the second member. In contrast, according to "a second member on a first member" and "a second member under a first member", the second member is in contact with the first member.

In addition, an observation position at which the intelligent reflecting surface is to be observed is assumed to be located on the tip side of the arrow of the third direction Z, and viewing from the observation position toward an X-Y plane defined by the first direction X and the second direction Y is referred to as plan view. Viewing a cross-section of the intelligent reflecting surface on an X-Z plane defined by the first direction X and the third direction Z or a Y-Z plane defined by the second direction Y and the third direction Z is referred to as cross-sectional view.

Embodiment

FIG. 1 is a cross-sectional view showing the intelligent reflecting surface of the embodiment. The intelligent reflecting surface RE can reflect radio waves and functions as a relay device for radio waves.

As shown in FIG. 1, the intelligent reflecting surface RE comprises a first substrate SUB1, a second substrate SUB2, and a liquid crystal layer LC. The first substrate SUB1 includes an electrically insulating base BA1, a plurality of patch electrodes PEF, an insulating layer INS, a plurality of patch electrodes PEL, and an alignment film AL1.

The base BA1 is formed in a flat plate shape and extends along an X-Y plane including the first direction X and the second direction Y orthogonal to each other.

The plurality of patch electrodes PEF are provided on the base BA1.

The insulating layer INS is provided to cover the plurality of patch electrodes PEF.

The plurality of patch electrodes PEL are provided on the insulating layer INS. The plurality of patch electrodes PEL are opposed to the plurality of patch electrodes PEF in the third direction and overlap each other.

The alignment film AL1 is provided to cover the patch electrodes PEL.

Incidentally, in the embodiment, the patch electrodes PEF and the patch electrodes PEL may also be totally referred to as patch electrodes PE.

The second substrate SUB2 is opposed to the first substrate SUB1 with a predetermined gap. The second substrate SUB2 includes an electrically insulating base BA2, a common electrode CE, and an alignment film AL2. The base BA2 is formed in a flat plate shape and extends along the X-Y plane.

The common electrode CE is provided to be in contact with the base BA2. An insulating layer (not shown) may be provided between the common electrode CE and the base BA1.

The alignment film AL2 is provided to cover the common electrode CE. In the embodiment, each of the alignment film AL1 and the alignment film AL2 is a horizontal alignment film.

The first substrate SUB1 and the second substrate SUB2 are joined by a sealing material SAL arranged on their respective peripheral portions. The liquid crystal layer LC is provided in a space surrounded by the first substrate SUB1, the second substrate SUB2, and the sealing member SAL. The liquid crystal layer LC is held between the first substrate SUB1 and the second substrate SUB2.

A thickness (cell gap) of the liquid crystal layer LC is referred to as d1. The thickness d1 is greater than a thickness of a liquid crystal layer of a normal liquid crystal display panel. In the embodiment, the thickness d1 is 50 μm. However, the thickness d1 may be less than 50 μm as long as the reflection phase of radio waves can be sufficiently adjusted. Alternatively, the thickness d1 may exceed 50 μm in order to increase the reflection angle of radio waves. The liquid crystal material used for the liquid crystal layer LC of the intelligent reflecting surface RE is different from the liquid crystal material used for ordinary liquid crystal display panels. The above-described reflection phase of the radio waves will be described later.

A common voltage is applied to the common electrode CE, and the potential of the common electrode CE is fixed. In the embodiment, the common voltage is a ground voltage, for example, 0V. A voltage is also applied to the patch electrodes PE. In the embodiment, the patch electrodes PE are AC-driven. The liquid crystal layer LC is driven by an electric field generated between the pixel electrodes PE and the common electrode CE. A voltage applied between the patch electrodes PE and the common electrode CE acts on the liquid crystal layer LC, thereby changing the dielectric constant of the liquid crystal layer LC.

When the dielectric constant of the liquid crystal layer LC changes, the propagation speed of radio waves in the liquid crystal layer LC also changes. For this reason, the reflection phase of radio waves can be adjusted by adjusting the voltage applied to the liquid crystal layer LC. The reflection direction of radio waves can be thereby adjusted.

In the embodiment, an absolute value of the voltage applied to the liquid crystal layer LC is 10V or less. This is because the dielectric constant of the liquid crystal layer LC is saturated at 10V. However, since the voltage at which the liquid crystal layer LC is saturated varies depending on the dielectric constant of the liquid crystal layer LC, the absolute value of the voltage acting on the liquid crystal layer LC may exceed 10V. For example, when improvement of the response speed of the liquid crystal is required, a voltage of 10V or less may be applied to the liquid crystal layer LC after a voltage exceeding is applied to the liquid crystal layer LC.

The first substrate SUB1 has an incident surface Sa on the side opposite to the side opposed to the second substrate SUB2. In FIG. 1, an incident wave w1 is a radio wave made incident on the intelligent reflecting surface RE, and a reflected wave w2 is a radio wave reflected on the intelligent reflecting surface RE.

Figure 2:
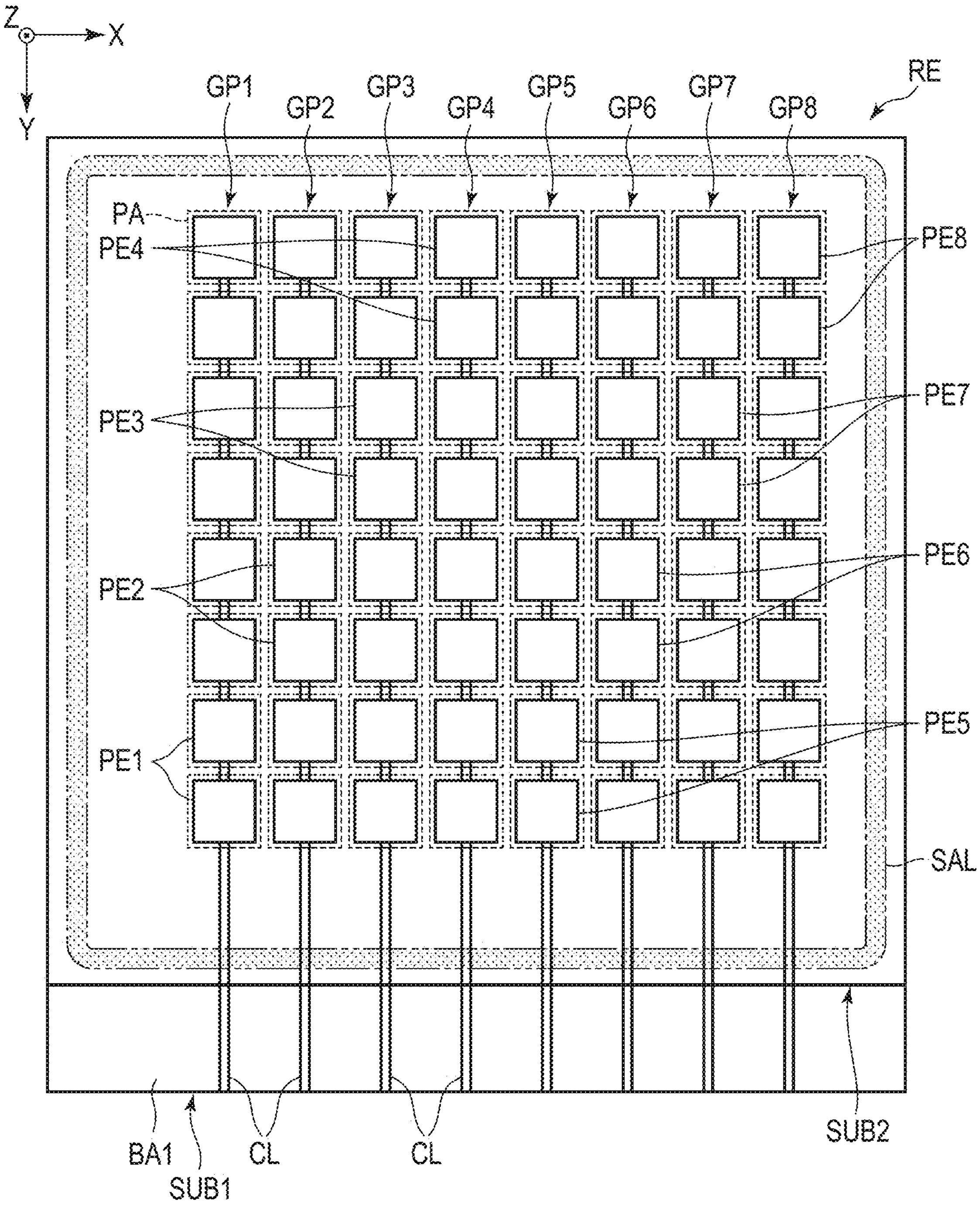
FIG. 2 is a plan view showing the intelligent reflecting surface shown in FIG. 1.

FIG. 2 is a plan view showing the intelligent reflecting surface shown in FIG. 1. The intelligent reflecting surface RE shown in FIG. 2 includes a plurality of patch areas PA arrayed in a matrix along each of the first direction X and the second direction Y. Each of the patch areas PA includes the patch electrode PE. The patch electrode PE shown in FIG. 2 is assumed to indicate the patch electrode PEF and the patch electrode PEL that overlap each other.

The plurality of patch electrodes PE are arrayed in a matrix at intervals along the first direction X and the second direction Y. On the X-Y plane, the plurality of patch electrodes PE have the same shape and the same size. The plurality of patch electrodes PEL are provided on the same plane (X-Y plane), and the plurality of patch electrodes PEF are provided on the same plane (X-Y plane) above the patch electrodes PEL.

The plurality of patch electrodes PE are arranged at regular intervals along the first direction X and arranged at equal intervals along the second direction Y. The plurality of patch electrodes PE are included in the plurality of patch electrode groups GP extending along the second direction Y and arranged along the first direction X. In FIG. 2, the plurality of patch electrode groups GP include, for example, a first patch electrode group GP1 to an eighth patch electrode group GP8.

The first patch electrode group GP1 includes a plurality of first patch electrodes PE1, the second patch electrode group GP2 includes a plurality of second patch electrodes PE2, the third patch electrode group GP3 includes a plurality of third patch electrodes PE3, the fourth patch electrode group GP4 includes a plurality of fourth patch electrodes PE4, the fifth patch electrode group GP5 includes a plurality of fifth patch electrodes PE5, the sixth patch electrode group GP6 includes a plurality of the six patch electrodes PE6, the seventh patch electrode group GP7 includes a plurality of seventh patch electrodes PE7, and the eighth patch electrode group GP8 includes a plurality of eighth patch electrodes PE8. For example, the second patch electrodes PE2 are located between the first patch electrodes PE1 and the third patch electrodes PE3 in the direction along the first direction X.

Each patch electrode group GP includes a plurality of patch electrodes PE arranged along the second direction Y and electrically connected to each other. In the embodiment, the plurality of patch electrodes PE of each patch electrode group GP are connected by connection wires CL. The connection wires CL may be connected to only the plurality of patch electrodes PEL, and the connection wires CL may not be provided for the plurality of patch electrodes PEF. In other words, the patch electrodes PEF may be in a floating state. In this case, the patch electrodes PE shown in FIG. 2 indicate the patch electrodes PEL. Although not shown, the connection wires CL may be provided for each of the plurality of patch electrodes PEL and each of the plurality of patch electrodes PEF.

The intelligent reflecting surface RE shown in FIG. 2 is not provided with a switching element for each patch electrode PE, and a voltage is applied via the connection wires CL. In other words, the intelligent reflecting surface RE shown in FIG. 2 is driven by passive drive. However, the intelligent reflecting surface of the embodiment is not limited to this, but a switching element may be provided for each patch electrode PE and driven by so-called active drive. The details will be described later.

The plurality of connection wires CL extend along the second direction Y and are arranged along the first direction X, on the first substrate SUB1. The connection wires CL extend to an area of the first substrate SUB1, which is not opposed to the second substrate SUB2. Unlike the embodiment, the plurality of connection wires CL may be connected to the plurality of patch electrodes PE in one-to-one relationship.

In the embodiment, the plurality of patch electrodes PE arranged along the second direction Y and the connection wires CL are integrally formed of the same conductors. Incidentally, the plurality of patch electrodes PE and the connection wires CL may be formed of conductors different from each other. The patch electrodes PE, the connection wires CL, and the above common electrode CE are formed of metal or a conductor similar to metal. For example, the patch electrodes PE, the connection lines CL, and the common electrode CE may be formed of a transparent conductive material such as indium tin oxide (ITO). The connection wires CL may be connected to an outer lead bonding (OLB) pad (not shown). One patch area PA includes one patch electrode PE and a part of the connection wire CL which connects adjacent patch electrodes PE.

The connection wire CL is a fine wire, and a width of the connection wire CL is sufficiently smaller than a length Px which will be described later. The width of the connection wire CL is several μm to several tens of μm, and is on the order of μm. Incidentally, if the width of the connection wire L is too large, the sensitivity to the frequency component of the radio waves is changed, which is not desirable.

The sealing material SAL is arranged at a peripheral portion of the area where the first substrate SUB1 and the second substrate SUB2 are opposed to each other.

FIG. 2 shows the example in which eight patch electrodes PE are arranged in the direction along the first direction X and the direction along the second direction Y, but the embodiment is not limited to this. The number of patch electrodes PE can be variously modified. For example, hundred patch electrodes PE may be arranged along the first direction X, and a plurality of (for example, hundred) patch electrodes PE may be arranged along the second direction Y. A length of the intelligent reflecting surface RE (first substrate SUB1) in the direction along the first direction X is, for example, 40 cm or more and 80 cm or less.

Figure 3:
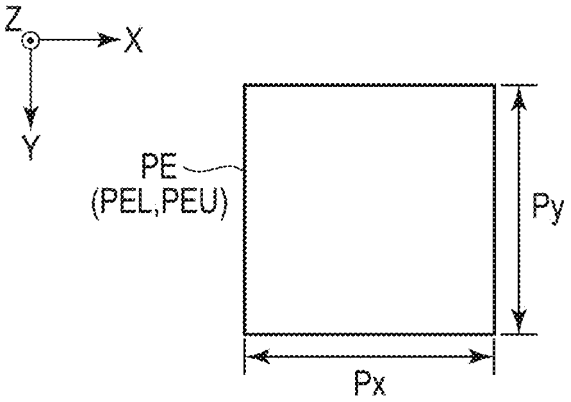
FIG. 3 is an enlarged plan view showing the patch electrode.

FIG. 3 is an enlarged plan view showing the patch electrode. In the embodiment, the patch electrode PEL and the patch electrode PEF have the same shape. Therefore, the patch electrode PE shown in FIG. 3 shows the shape of both the patch electrode PEL and the patch electrode PEF.

The patch electrode PE has a square shape. The shape of the patch electrode PE is not particularly limited, but a square or a perfect circle is desirable. When the external shape of the patch electrode PE is focused, a shape in which an aspect ratio of vertical and horizontal lengths is 1:1 is desirable. This is because a 90° rotationally symmetrical structure is desirable to respond to a horizontally polarized wave and a vertically polarized wave.

The patch electrode PE has a length Px in a direction along the first direction X and a length Py in a direction along the second direction Y. The length Px and the length Py are desirably adjusted according to the frequency range of the incident wave w1. Next, a desirable relationship between the frequency range of the incident wave w1, and the length Px and the length Py will be exemplified.

2.4 GHz:Px=Py=35 mm 5.0 GHz:Px=Py=16.8 mm

28 GHz:Px=Py=3.0 mm

Figure 4:
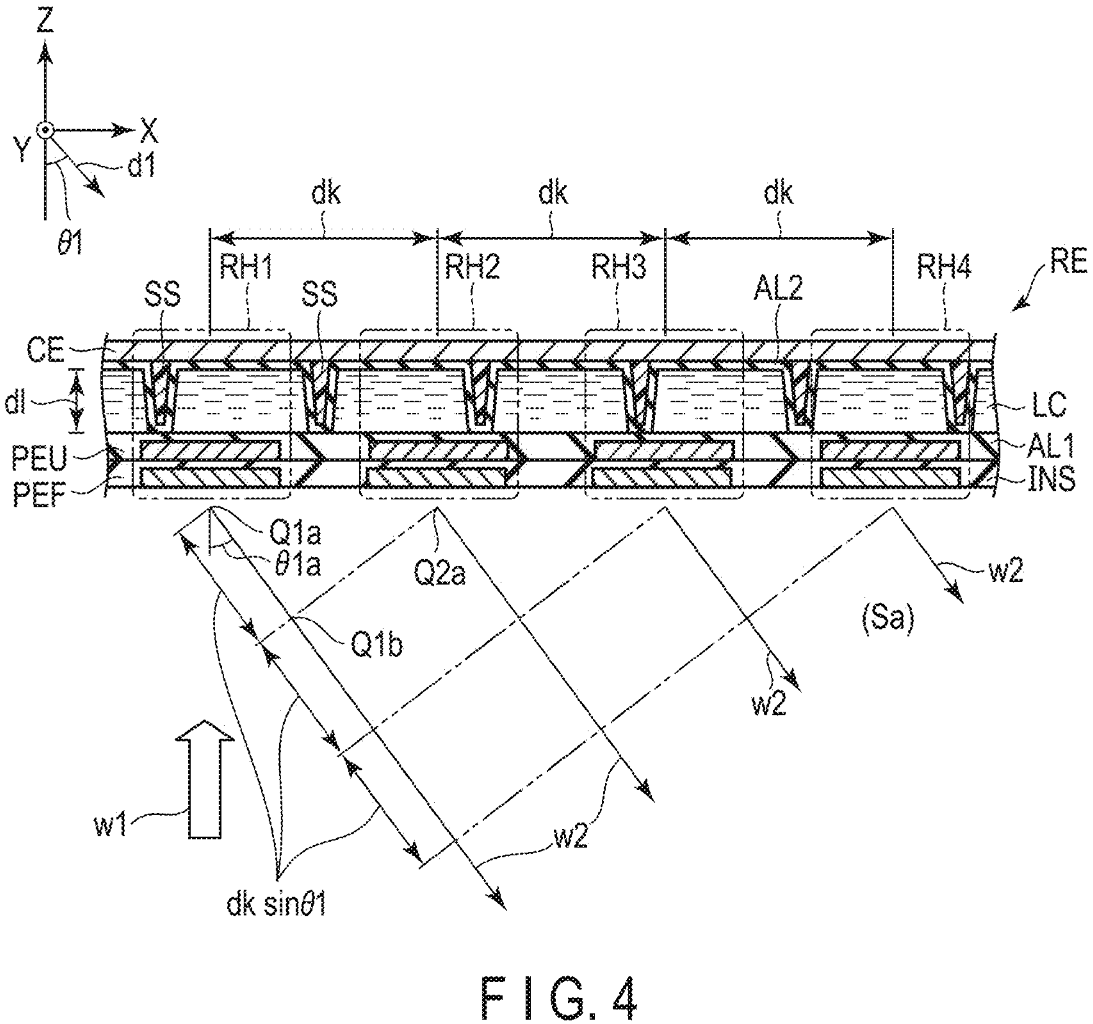
FIG. 4 is an enlarged cross-sectional view showing a part of the intelligent reflecting surface.

FIG. 4 is an enlarged cross-sectional view showing a part of the intelligent reflecting surface. As shown in FIG. 4, a thickness d1 (cell gap) of the liquid crystal layer LC is held by a plurality of spacers SS. In the embodiment, the spacers SS are columnar spacers, formed in the second substrate SUB2, and protruding toward the first substrate SUB1 side.

The width of the spacer SS is 10 μm or more and 20 μm or less. While the length Px and the length Py of the patch electrode PE are on the order of mm, a cross-sectional diameter of the spacer SS in the first direction X is on the order of μm. For this reason, the spacers SS need to exist in the areas opposed to the patch electrodes PE. In addition, a ratio of the areas where the plurality of spacers SS exist, of the areas opposed to the patch electrodes PE is approximately 1%. For this reason, even if the spacers SS exist in the above areas, the influence of the spacers SS on the reflected wave w2 is small. Incidentally, the spacers SS may be formed in the first substrate SUB1 and protrude toward the second substrate SUB2 side. Alternatively, the spacers SS may be spherical spacers.

The intelligent reflecting surface RE comprises a plurality of reflection controllers RH. Each reflection controller RH includes one patch electrode PE (i.e., the patch electrode PEL and the patch electrode PEF which overlap in the third direction) among the plurality of patch electrodes PE, a portion of the common electrode CE, which is opposed to the one patch electrode PE, and an area of the liquid crystal layer LC, which is opposed to the one patch electrode PE. Each reflection controller RH functions to adjust the phase of the radio wave (incident wave w1) made incident from the incident surface Sa side according to the voltage applied to the patch electrode PE, and urge the radio wave to be reflected on the incident surface Sa side as the reflected wave w2. In each reflection controller RH, the reflected wave w2 is a synthetic wave of the radio wave reflected on the patch electrode PE and the radio wave reflected on the common electrode CE. As described above, when the plurality of patch electrodes PEL are connected by the connection lines CL and the plurality of patch electrodes PEF are in the floating state, the voltage is applied to only the plurality of patch electrodes PEL.

The patch electrodes PE are arranged at regular intervals in the direction along the first direction X. A length (pitch) between adjacent patch electrodes PE is referred to as dk. The length dk corresponds to a distance from a geometric center of one patch electrode PE to a geometric center of the adjacent patch electrode PE. In the embodiment, it is assumed that the reflected waves w2 have the same phase in the first reflection direction d1. On the X-Z plane of FIG. 4, the first reflection direction d1 is a direction forming a first angle θ1 with the third direction Z. The first reflection direction d1 is parallel to the X-Z plane. In FIG. 4, θ1a is equal to θ1 (θ1=θ1a).

In order for the phases of the radio waves reflected on the plurality of reflection controllers RH to be aligned in the first reflection direction d1, the phases of the radio waves need only be aligned on the linear two-dot chain line. For example, the phase of the reflected wave w2 at point Q1*b* and the phase of the reflected wave w2 at point Q2*a* may be aligned. A physical linear distance from point Q1*a* to point Q1*b* of the first patch electrode PE1 is dk×sin θ1. Therefore, when the first reflection controller RH1 and the second reflection controller RH2 are focused, the phase of the reflected wave w2 from the second reflection controller RH2 may be delayed from the phase of the reflected wave w2 from the first reflection control section RH1 by a phase amount δ1. The phase amount δ1 is represented by the following equation.

$$\delta 1 = dk \times \sin \theta 1 \times 2\pi/\lambda$$

Figure 5:
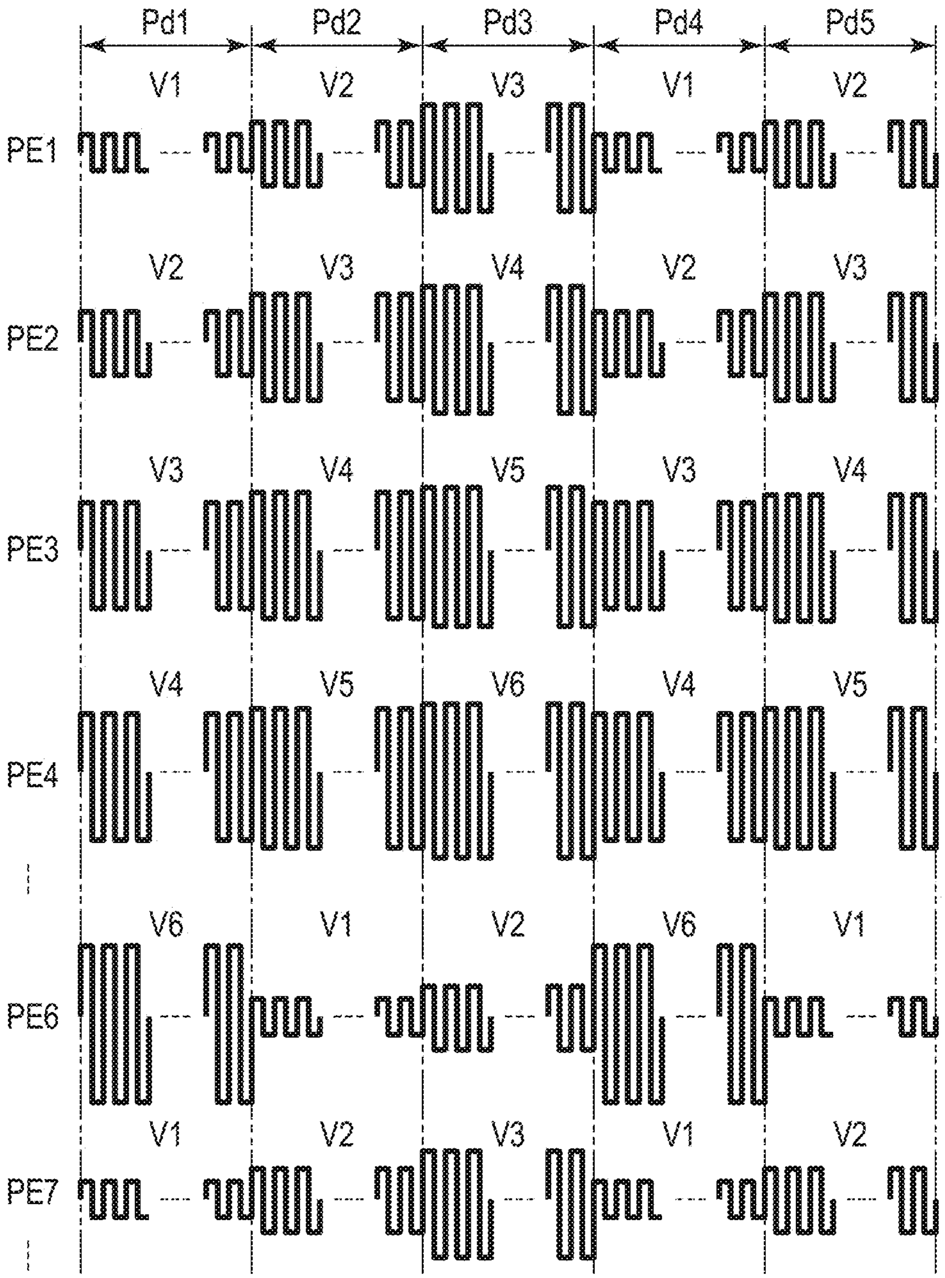
FIG. 5 is a timing chart showing changes in the voltage applied to the patch electrode for each period in a method of driving the intelligent reflecting surface of the embodiment.

FIG. 5 is a timing chart showing changes in the voltage applied to the patch electrode for each period in a method of driving the intelligent reflecting surface of the embodiment. FIG. 5 shows a first period Pd1 to a fifth period Pd5 of the driving periods of the intelligent reflecting surface RE. In the embodiment, when a voltage is applied to only the patch electrode PEL as described above and the patch electrode PEF is in a floating state, the patch electrode PE in FIG. 5 is assumed to indicate the patch electrode PEL.

As shown in FIG. 4 and FIG. 5, when driving the intelligent reflecting surface RE is started, voltages V are applied to the plurality of patch electrodes PE such that the radio waves reflected on the plurality of reflection controllers RH have the same phase in the first reflection direction d1 for the first period Pd1. For example, a first voltage V1 is applied to the first patch electrode PE1, a second voltage V2 is applied to the second patch electrode PE2, and a third voltage V3 is applied to the third patch electrode PE3.

In a second period Pd2 following the first period Pd1, voltages are applied to the plurality of patch electrodes PE such that the radio waves reflected by the plurality of reflection controllers RH are held in the same phase in the first reflection direction d1. For example, the second voltage V2 is applied to the first patch electrode PE1, the third voltage V3 is applied to the second patch electrode, and the fourth voltage V4 is applied to the third patch electrode PE3.

In each period Pd, the same voltage is applied to the plurality of patch electrodes PE of each patch electrode group GP via the connection lines CL.

When the potential of the common electrode CE is referred to as a reference, in each of the first period Pd1 and the second period Pd2, the polarity of the voltage applied to each patch electrode PE is periodically reversed. For example, the patch electrode PE is driven with a drive frequency of 60 Hz. Since the patch electrode PE is AC-driven, a fixed voltage is not applied to the liquid crystal layer LC for a long period. Since the occurrence of burning can be suppressed, deviation of the direction of the reflected wave w2 from the first reflection direction d1 can be suppressed.

Furthermore, in the embodiment, in each patch electrode PE, an absolute value of the voltage applied for the second period Pd2 is different from an absolute value of the voltage applied for the first period Pd1. Since the occurrence of burning can be sufficiently suppressed, the deviation of the direction of the reflected wave w2 from the first reflection direction d1 can be suppressed.

Even if the period Pd changes to another period Pd, the phase amount δ1 of the radio waves reflected in the first reflection direction d1 by one reflection controller RH and the radio waves reflected in the first reflection direction d1 by the adjacent reflection controller RH is maintained. In the embodiment, the phase amount δ1 is 60°.

In the example shown in FIG. 5, the sixth voltage V6 is applied to the sixth patch electrode PE6 for the first period Pd1. A phase difference of 300° is assigned between the radio waves reflected in the first reflection direction d1 by the first reflection controller RH1 and the radio waves reflected in the first reflection direction d1 by the sixth reflection controller including the sixth patch electrode PE6.

A seventh voltage may be applied to the seventh patch electrode PE7 for the first period Pd1 to assign a phase difference of 360° between the radio waves reflected in the first reflection direction d1 by the first reflection controller RH1 and the radio waves reflected in the first reflection direction d1 by the seventh reflection controller including the seventh patch electrode PE7. In the embodiment, however, the first voltage V1 is applied to the seventh patch electrode PE7 for the first period Pd1. A large number of patch electrodes PE can be driven while suppressing the types of voltages V, by a periodic voltage application pattern.

Figure 6:
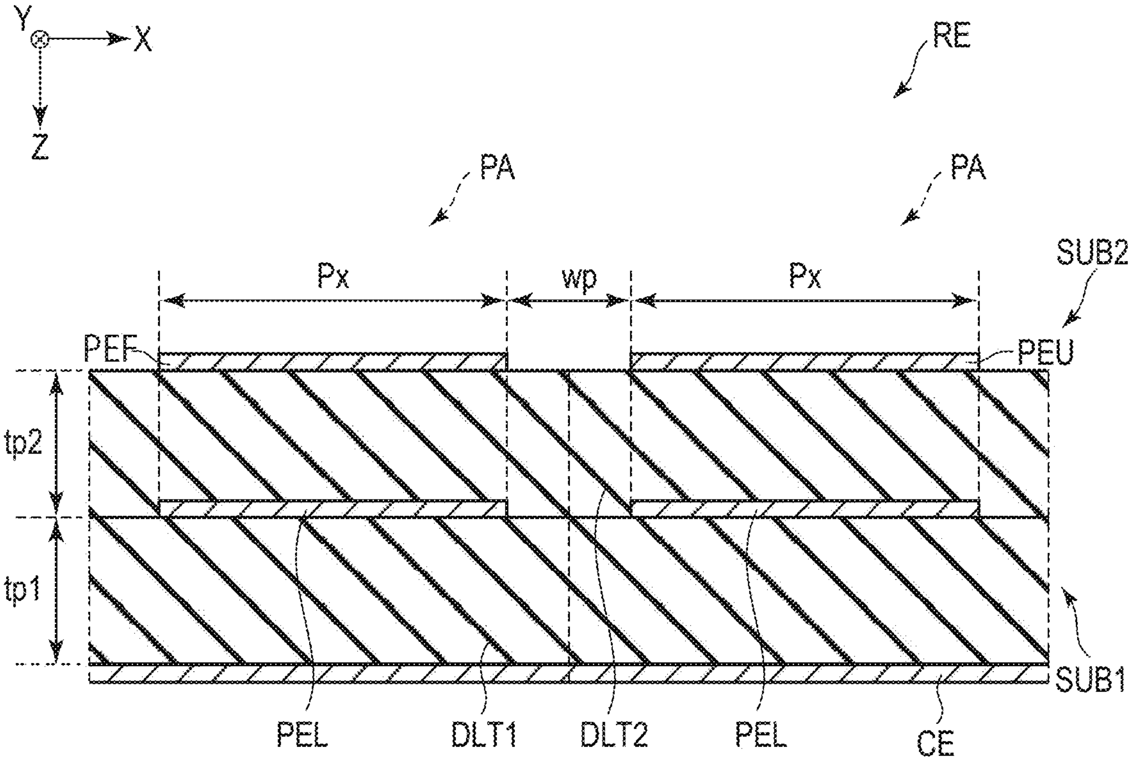
FIG. 6 is an enlarged cross-sectional view showing the intelligent reflecting surface of the embodiment.

FIG. 6 is an enlarged cross-sectional view showing the intelligent reflecting surface of the embodiment. The intelligent reflecting surface RE of the embodiment comprises the common electrode CE, a dielectric layer DLT1, the patch electrode PEL, a dielectric layer DLT2, and the patch electrode PEF. The dielectric layer DLT1 shown in FIG. 6 is a dielectric layer having a variable dielectric constant ε1 and is, for example, the liquid crystal layer LC shown in FIG. 1 and FIG. 4. The dielectric layer DLT2 is a dielectric layer having a fixed dielectric constant ε2 and corresponds to the insulating layer INS shown in FIG. 1 and FIG. 4.

The intelligent reflecting surface RE of the embodiment is considered to be an intelligent reflecting surface comprising the stacked layer bodies of the patch electrodes PE and the dielectric layers in two layers. The intelligent reflecting surface comprising the stacked layer bodies in two layers can increase the phase difference amount as compared to a case of comprising only one layer of the stacked layer body. A specific example will be described below.

Px shown in FIG. 6 denotes the length of the patch electrode PE as described above. A distance between the patch electrodes PE is referred to as distance wp. Thicknesses of the dielectric layers DLT1 and DLT2 are referred to as thickness tp1 and thickness tp2, respectively. Since the patch electrode PE has a square shape, the length Py is equal to the length Px.

An intelligent reflecting surface in a case where the stacked layer body is provided in one layer, for example, the patch electrode PEF and the dielectric layer DLT2 are not provided, will be considered as a comparative example. The intelligent reflecting surface RE of the embodiment and the intelligent reflecting surface of the comparative example were compared under the conditions described below.

In the intelligent reflecting surface RE of the embodiment, the thickness tp1 of the dielectric layer DLT1 and the thickness tp2 of the DLT2 are set to 50 μm and 30 μm, respectively. The frequency of the incident wave w1, the length Px of the patch electrodes PE (patch electrodes PEF and PEL), and the distance wp between the patch electrodes PE are 28 GHz, 3,000 μm, and 50 μm, respectively.

In contrast, in the intelligent reflecting surface of the comparative example, the patch electrode PEF of the patch electrodes PE and the dielectric layer DLT2 are not provided as described above, i.e., the thickness tp2 of the dielectric layer DLT2 is 0 μm. Other conditions are the same as those of the intelligent reflecting surface RE of the embodiment.

In the intelligent reflecting surface RE of the embodiment, the reflectance was 0 dB to 10 dB, and the phase difference amount of the reflected radio wave was 280 dB. In the intelligent reflecting surface of the comparative example, the reflectance was 0 dB to dB and the phase difference amount was 180 dB. Thus, the phase difference amount of the reflected radio waves can be increased by forming the stacked layer bodies of the dielectric layers and the patch electrodes in two layers.

The dielectric constant ε1 of the dielectric layer DLT1 may be, for example, 2.5 or more and 3.5 or less. For example, the liquid crystal layer may be used as described above, but is not limited to this. As the dielectric layer DLT1, the other variable dielectric, more specifically, a dielectric whose dielectric constant can be varied by an operation from the outside may be used.

The dielectric constant ε2 of the dielectric layer DLT2 may be set to a fixed value, for example, 2.5. Dielectrics having such a dielectric constant ε2 include, for example, organic insulating materials, more specifically, polyimide or acrylic. The upper limit of the dielectric constant ε2 is desirably approximately twice the dielectric constant ε1.

The thickness tp2 of the dielectric layer DLT2 is set to 30 μm in the above description, but is not limited to this. The thickness tp2 may be approximately twice the thickness d1 of the dielectric layer DLT1, for example, more than 0 μm and less than or equal to 75 μm.

As described above, the intelligent reflecting surface RE of the embodiment can increase the phase difference amount of the reflected radio waves by forming the stacked layer bodies of the dielectric layers and the patch electrodes in two layers.

Figure 7:
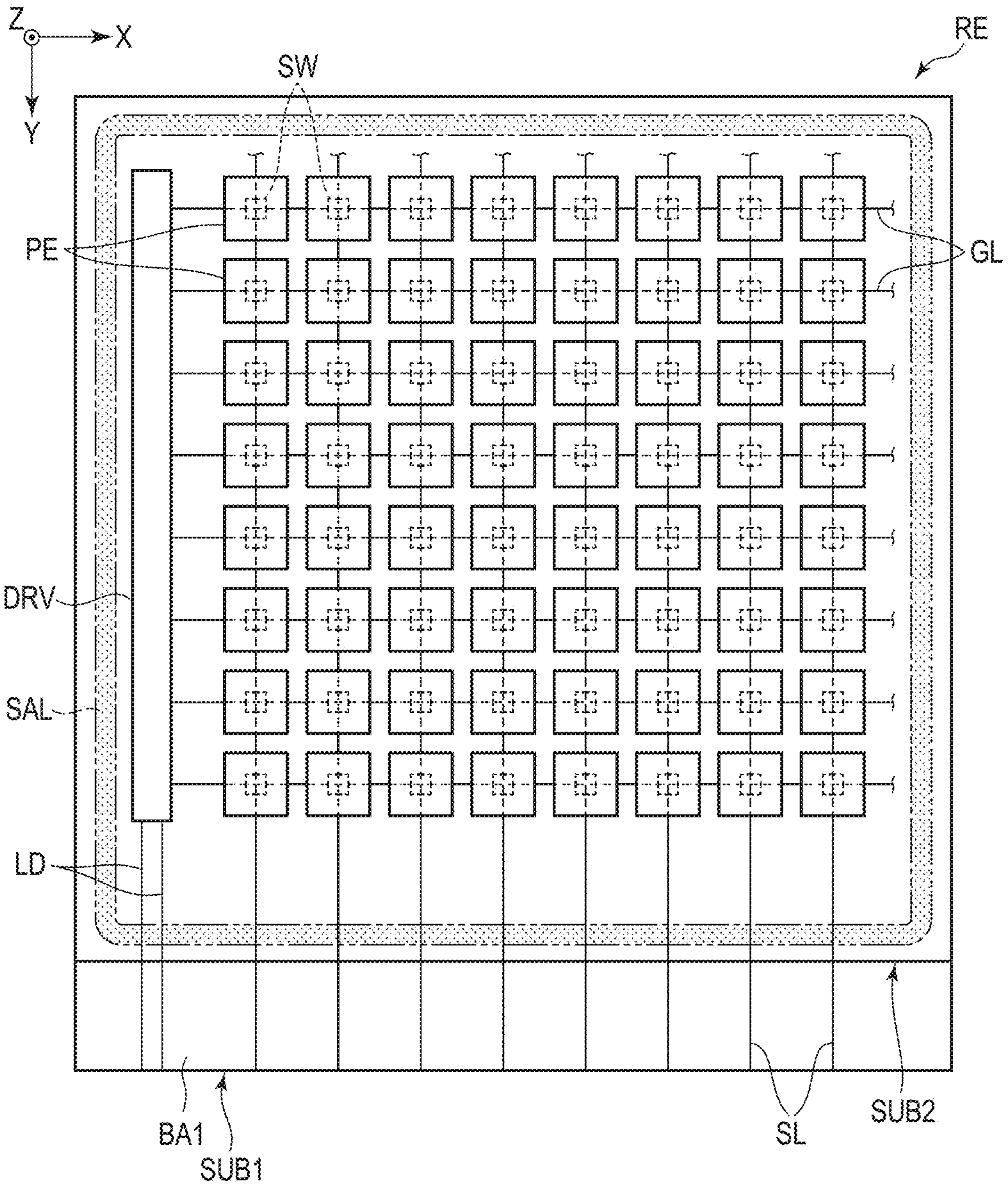
FIG. 7 is a plan view showing the intelligent reflecting surface of the embodiment.

FIG. 7 is a plan view showing the intelligent reflecting surface of the embodiment. The example shown in FIG. 7 is different from the example shown in FIG. 1 in that a switching element for controlling the patch electrode PE is provided.

As shown in FIG. 7, the first substrate SUB1 includes a plurality of signal lines SL, a plurality of scanning lines GL, a plurality of switching elements SW, a drive circuit DRV, and a plurality of lead lines LE instead of the connection lines CL.

The plurality of signal lines SL extend along the second direction Y and are arranged along the first direction X. The plurality of scanning lines GL extend along the first direction X and are arranged along the second direction Y. The plurality of scanning lines GL are connected to the drive circuit DRV. The switching element SW is provided near an intersection of one signal line SL and one scanning line GL. A plurality of lead lines LD are connected to the drive circuit DRV. Each of the signal lines SL and the lead lines LD may be connected to an outer lead bonding (OLB) pad.

Figure 8:
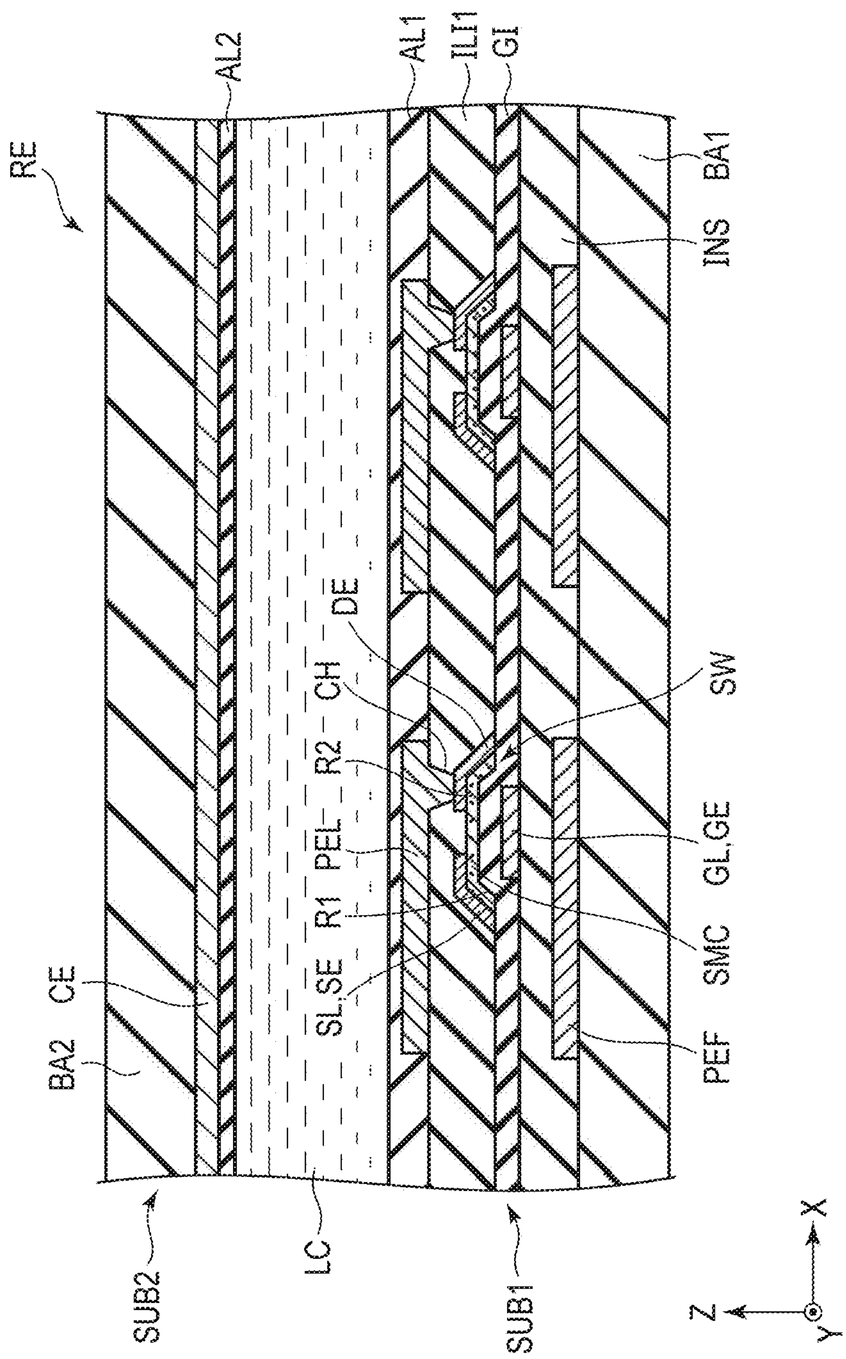
FIG. 8 is a partially enlarged cross-sectional view showing the intelligent reflecting surface.

FIG. 8 is a partially enlarged cross-sectional view showing the intelligent reflecting surface. As shown in FIG. 8, the scanning line GL is provided on the base BA1 of the intelligent reflecting surface RE. The scanning line GL includes a gate electrode GE. The scanning line GL is provided on the base BA1, the patch electrodes PEF, and the insulating layer INS.

An insulating layer GI is formed to cover the scanning line GL. A semiconductor layer SMC is provided on the insulating layer GI. The semiconductor layer SMC overlaps with the gate electrode GE and includes a first area R1 and a second area R2. One of the first region R1 and the second region R2 is a source region and the other is a drain region.

The gate electrode GE, the semiconductor layer SMC, and the like constitute a switching element SW as a thin-film transistor (TFT). The switching element SW may be a bottom-gate thin film transistor or a top-gate thin film transistor.

A source electrode SE is provided to be in contact with the first region R1 of the semiconductor layer SMC, and a drain electrode DE is provided to be in contact with the second region R2 of the semiconductor layer SMC. The source electrode SE may be formed integrally with the signal line SL.

An insulating layer ILI1 is formed on the insulating layer GI, the semiconductor layer SMC, the source electrode SE, and the drain electrode DE.

The patch electrode PE is L formed on the insulating layer ILI1. The patch electrode PEL is connected to the drain electrode DE through a contact hole CH formed in the insulating layer ILI1. The alignment film AL1 is formed on the insulating layer ILI2 and the patch electrode PEL.

Figure 9:
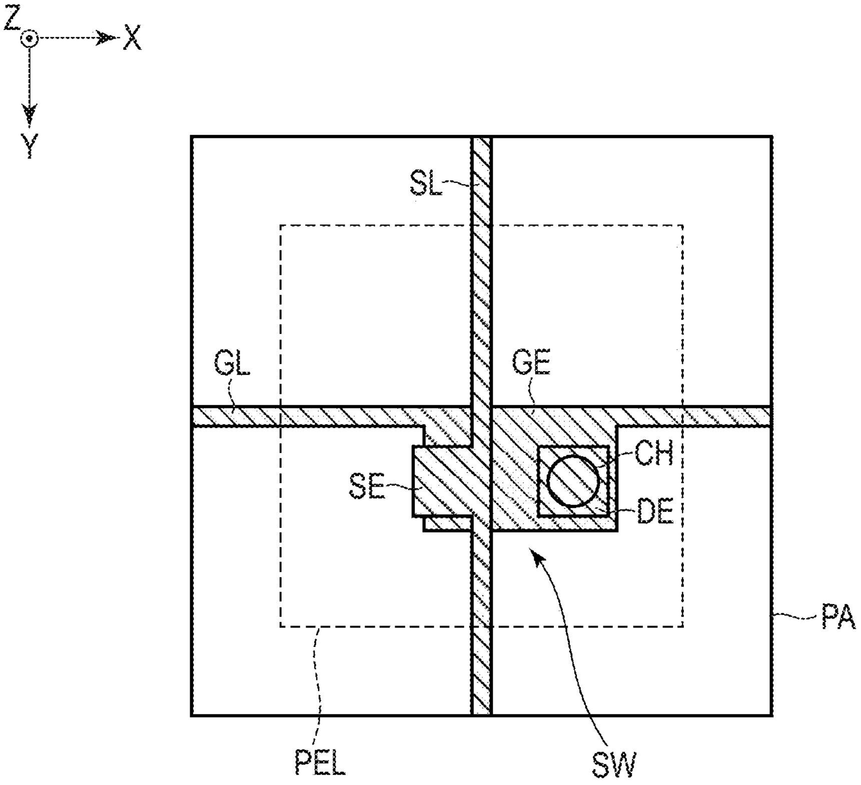
FIG. 9 is a plan view showing the switching element.

FIG. 9 is a plan view showing the switching element. In FIG. 9, description of the semiconductor layer SMC is omitted. Although not shown, the patch electrode PEF is arranged at a position which overlaps with the patch electrode PEL.

The scanning line GL extending along the first direction X and the signal line SL extending along the second direction Y have intersecting regions having large widths, respectively. The region having the large width, of the scanning line GL, is the gate electrode GE, and the region having the large width, of the signal line SL, is the source electrode SE.

As shown in FIG. 7 to FIG. 9, the plurality of patch electrodes PE (especially, the patch electrodes PEL) can be individually driven by active matrix driving. For this reason, the plurality of patch electrodes PE can be driven independently. For example, the direction of the reflected wave w2 reflected by the intelligent reflecting surface RE can be made parallel to the Y-Z plane.

On the active-matrix-driven intelligent reflecting surface RE as well, the phase difference amount of the reflected radio waves can be increased by forming the stacked layer bodies of the dielectric layers and the patch electrodes in two layers.

In the disclosure, the base BA1 and the base BA2 are referred to as a first base and a second base, respectively. The dielectric layer DLT1 and the dielectric layer DLT2 are referred to as a first dielectric layer and a second dielectric layer, respectively. The patch electrode PEL and the patch electrode PEF are referred to as a first patch electrode and a second patch electrode, respectively.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An intelligent reflecting surface comprising:

a first substrate;

a second substrate; and a first dielectric layer sandwiched between the first substrate and the second substrate, wherein the first substrate comprises:

a first base;

a plurality of first patch electrodes shaped in a square, which are arrayed in a matrix with regular intervals along each of a first direction and a second direction;

a plurality of second patch electrodes shaped in a square, which are provided between the first base and the plurality of first patch electrodes; and a second dielectric layer provided between the plurality of first patch electrodes and the plurality of second patch electrodes, the second substrate comprises:

a second base; and a common electrode provided to be in contact with the second base, the first dielectric layer has a first dielectric constant, and the second dielectric layer has a second dielectric constant.

2. The intelligent reflecting surface according to claim 1, wherein the first dielectric constant is variable, and the second dielectric constant is constant.

3. The intelligent reflecting surface according to claim 1, wherein the first dielectric layer is a liquid crystal layer, and the second dielectric layer is an organic insulating layer.

4. The intelligent reflecting surface according to claim 3, wherein a material of the organic insulating layer is polyimide or acryl.

5. The intelligent reflecting surface according to claim 1, wherein the first dielectric constant is 2.5 or more and 3.5 or less, and the second dielectric constant is 2.5.

6. The intelligent reflecting surface according to claim 1, wherein the second patch electrodes are in a floating state.

* * * * *